United States Patent [19]

Miyatake

[11] 4,135,350
[45] Jan. 23, 1979

[54] REAPING MACHINE FOR PARSLEY

[75] Inventor: Hirokazu Miyatake, Osaka, Japan

[73] Assignee: Kunimitsu Nagatoshi, Oxnard, Calif.

[21] Appl. No.: 762,167

[22] Filed: Jan. 24, 1977

[51] Int. Cl.$^2$ ................ A01D 37/00; A01D 45/00
[52] U.S. Cl. ........................... 56/131; 56/14.5; 56/327 R
[58] Field of Search ............. 56/10.2, 10.3, 11.9, 56/13.5, 13.6, 13.7, 13.8, 14.9, 16.4, 16.7, 16.9, 131, 140–152, 153, 157, 432–465, 327 R

[56] References Cited

U.S. PATENT DOCUMENTS

| | | | |
|---|---|---|---|
| 2,041,981 | 5/1936 | Tremouroux et al. | 56/131 |
| 3,543,493 | 12/1970 | Duda, Jr. | 56/327 R |
| 3,548,575 | 12/1970 | Lane | 56/327 R |
| 3,821,987 | 7/1974 | Shepardson et al. | 56/327 R X |

Primary Examiner—Russell R. Kinsey
Attorney, Agent, or Firm—Cushman, Darby & Cushman

[57] ABSTRACT

A reaping maching for parsley with automatic mechanisms for reaping and bundling parsley while it is moving over a parsley field. A pair of rotating cutter blades cut the plants at their lower stems. The plants are then moved rearward between endless elastic belts and the lower withered leaves removed by comb-like rotating mechanisms. At the end of the belts the parsley plants are bunched by a movable arm and moved to a position where each bunch is tied automatically with string.

5 Claims, 8 Drawing Figures

REAPING MACHINE FOR PARSLEY

BACKGROUND OF THE INVENTION

1. Field of the Invention

This invention relates to a reaping machine for parsley plants.

2. Description of the Prior Art

Heretofore, reaping of parsley has been done manually and then the work of bundling up the plants and getting rid of non-merchandizable parsley leaves was also done manually.

SUMMARY OF THE INVENTION

This invention is intended to provide a reaping and bundling machine with a base chassis receives runs over ridges in parsley fields. The machine provides a pair of rotary disk cutters horizontally installed on the lower front of the chassis, which cut parsley stems close at the base, and a device which transfers parsley between a pair of parallel endless rubber belts which circle from the front onto the rear portion of the chassis while they sweep withered leaves off at the lower stems of the parsleys during their transfer; at the rear end of the endless belts are provided supporting arms, each of which reeives parsley therein by grip pressure and then bundles up the parsley with metallic or vinyl strings after the supporting arms have turned 90 degrees, and then casts the bundles into a collecting box.

The general object of this invention is to provide an automated reaping and bundling machine for parsley.

Other various objects of this invention will be comprehended by the following description of the preferred embodiments.

DESCRIPTION OF THE PREFERRED EMBODIMENTS

The preferred embodiments of this invention will be hereinafter discussed with references to the accompanying drawings.

Figure 1:
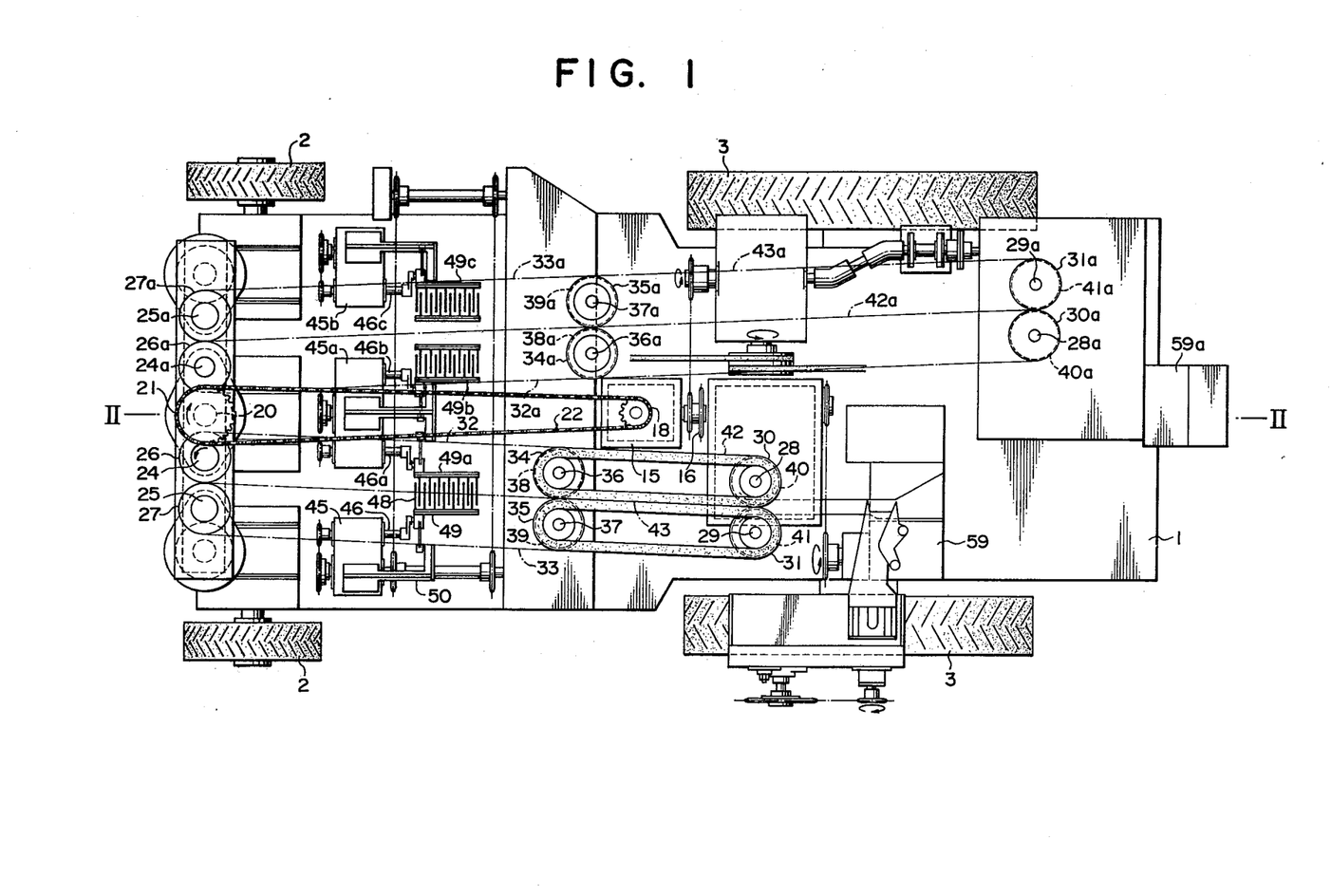
FIG. 1 is a plan view of the reaping and bundling machine according to this invention.
Figure 2:
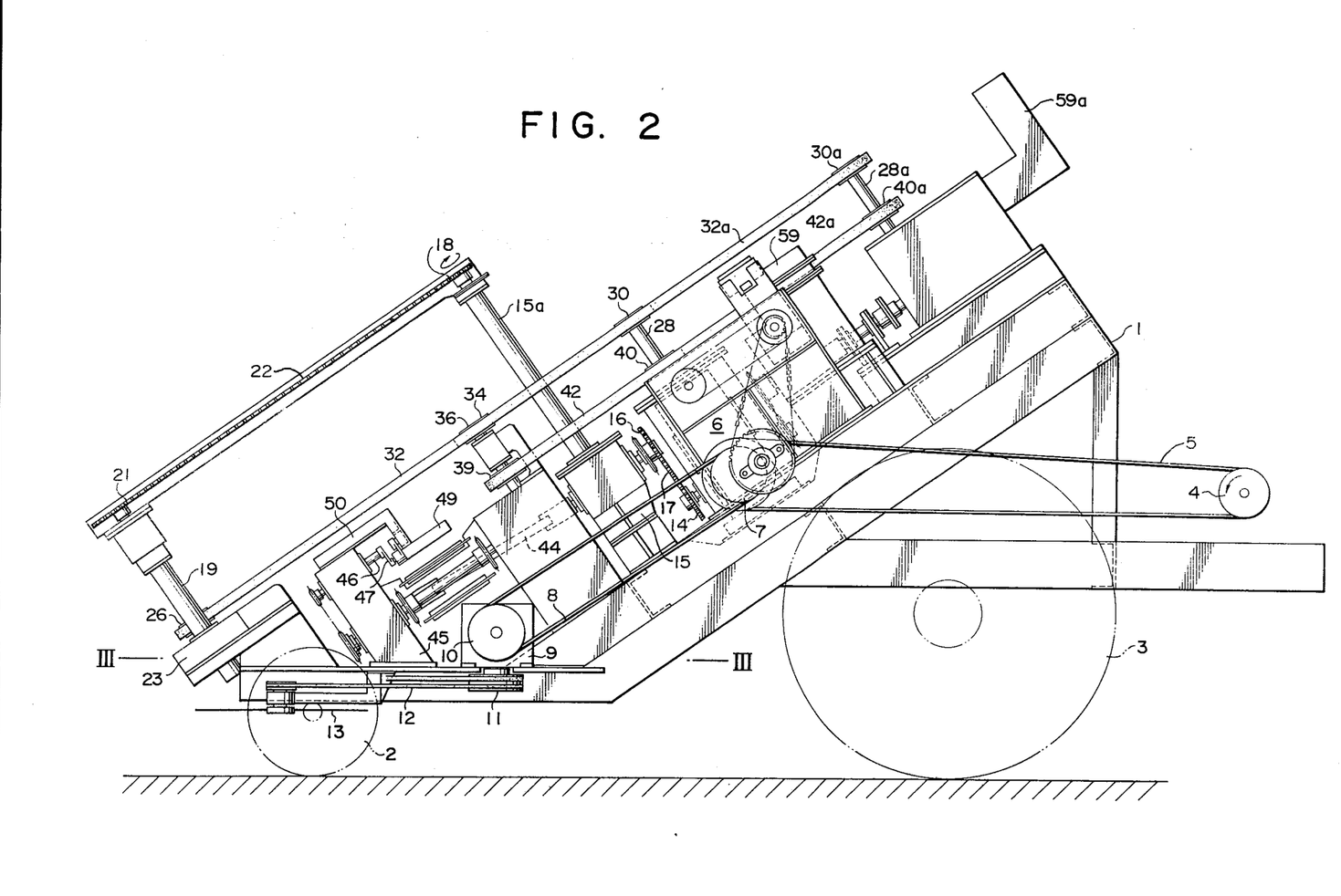
FIG. 2 is a vertical cross sectional view, taken along a line II—II in FIG. 1.
Figure 3:
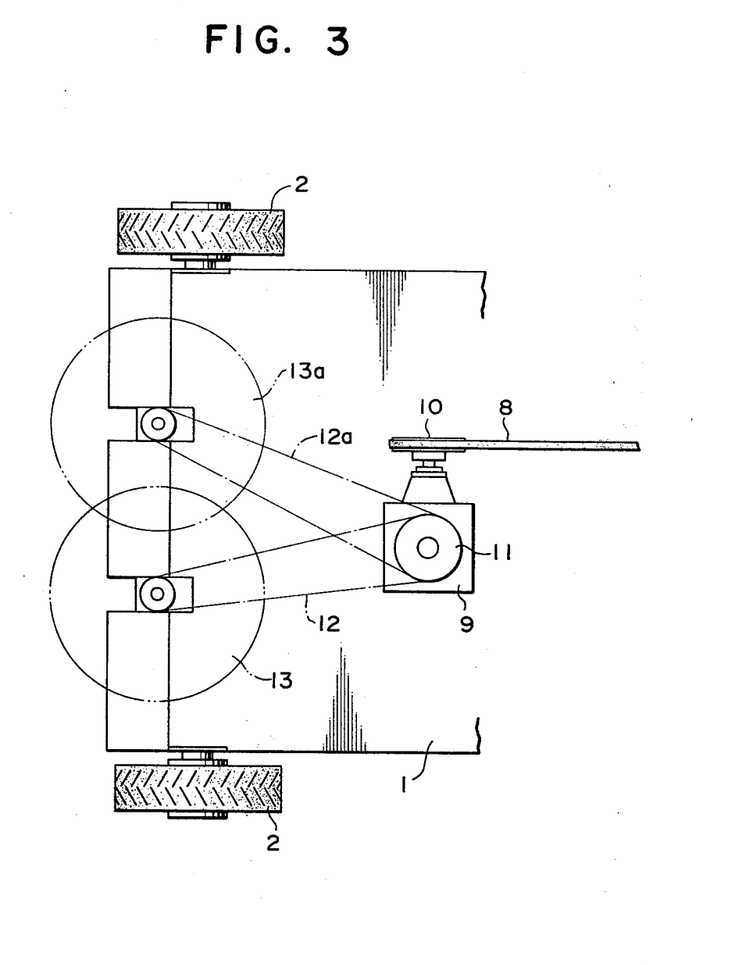
FIG. 3 is an enlarged plan view taken along a line of III—III in FIG. 2.

As shown in FIG. 2, a base chassis 1 is built to have an inclined upper surface, its rear end being higher than its front end which is disposed close to the field surface. The chassis has a pair of front wheels 2 and rear wheels 3 and a convenient motor or engine (not shown) provided at the rear end, with a pulley 4, a drive belt 5 disposed around the pulley, transmitting drive power to a pulley 7 set at an end of an axle or shaft protruding from a gear box 6, another gear (behind pulley 7 in FIG. 2) co-axial with pulley 7 within the gear box 6, a belt 8 extending around another pulley 10 of a transmission device 9 provided at the lower front of the chassis, device (9) serving to transmit power from pulley 10 to a pulley 11 thereby to rotate it, and a pair of belts 12, 12a are disposed about the pulley 11 and a pair of spaced pulleys which are adapted to rotate; a pair of rotary disk cutters 13, 13a mounted slightly above the field surface.

A chain 17 is disposed about sprockets 14 and 16 mounted upon shafts that extend from respective gear boxes 6 and 15, which in turn rotates a sprocket 18 at the upper portion of a rotary shaft longitudinally passing through the vertical pipe 15a from gear box 15. Another chain (22) extends about sprocket 18 and a sprocket 21 on rotary shaft 20 that extends longitudinally through a vertical pipe 19 at the front end of the chassis 1. Provided within a gear box 23 at the front of the chassis are rotary shafts 24, 25 and 24a, 25a which rotate respectively and alternatively in opposite directions, which ends extend above the gear box 23 and mount pulleys 26, 27 and 26a, 27a. Furthermore, pulleys 30, 31 and 30a 31a are attached to the rotary shafts 28, 29 and 28a, 29a which are disposed on the rear end of the chassis 1. Rubber belts 32, 33 and 32a, 33a are mounted between pulleys 26, 30 and 26a, 30a and also between 27, 31a. A pair of the belts 32, 33 are suspended closely in parallel and by the rotations of the pulleys 26, 27 move from front to rear of the chassis in face - to - face contact. Both surfaces have intimate face - to - face contact with another pair of the rubber belts 32a, 33a which also run in parallel from the front to rear ends. Respective pairs of belts 32, 33 and 32a, 33a have, in their middle, guide pulleys 34, 35 and 34a, 35a, at which lower ends are other pulleys 38, 39 and 38a, 39a which are attached to revolving shafts 36, 37 and 36a, 37a. Auxiliary shafts 28, 29 and 28a, 29a are installed, and to which pulleys 40, 41 and 40a, 41a are set in opposition to keep up with the formerly stated pulleys. Rubber belts 42, 42a are suspended between these pulleys 38, 40 and 38a, 40a, and in parallel to the rubber belts 33, 33a all belts run in the same direction at the same speed.

Consequently, in operation, the chassis(1) moves over the ridges of the parsley field, catching one cut row of parsley in the pair of rubber conveyers 32, 33 and another row next to the said row within the pair of rubber belts 32a, 33a and cutting off the stems closely at the base adjacent the ground by revolving disk cutters 13, 13a. Such reaped plants are suspended between the contact faces of the rubber conveyer belts 32, 33 and 32a, 33a and gradually transfered up towards the rear of the chassis 1.

Figure 4:
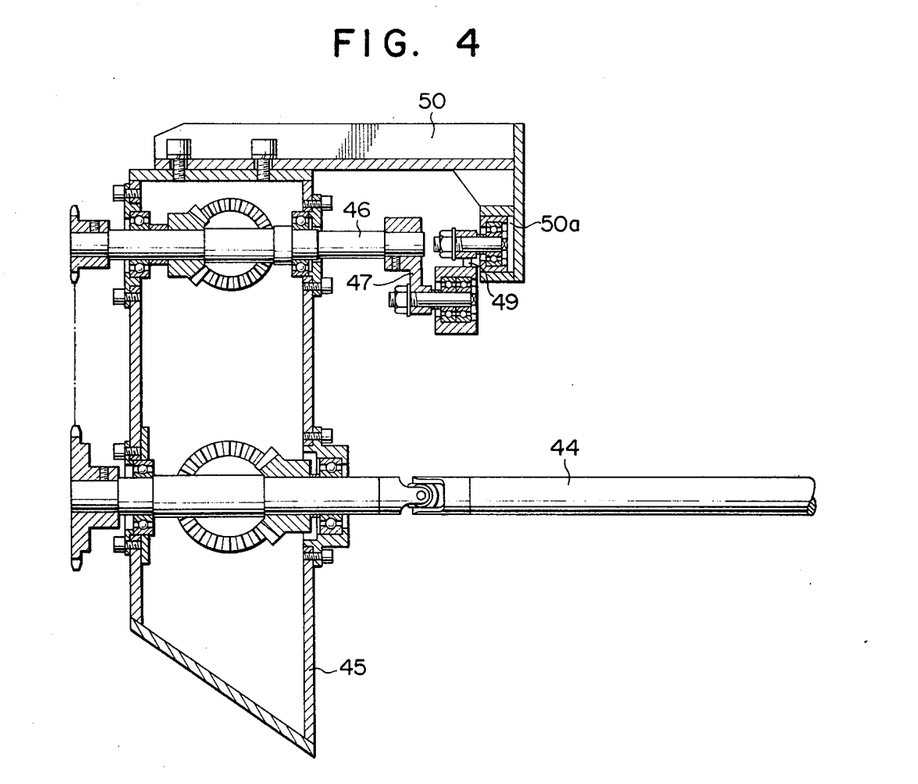
FIG. 4 is a cross sectional view showing a gear box actuating a comb-like mechanism.
Figure 5:
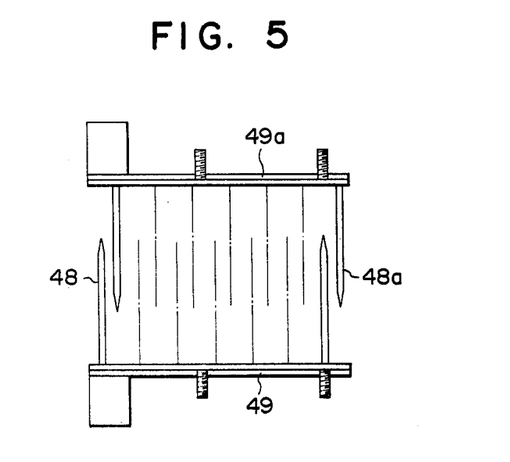
FIG. 5 is a plan view of the comb-like mechanism.

Usually the lower leaves are scraped off since they are generally withered leaves, not qualified for the table. In order to automatically scrape off withered leaves, this invention provides a comb-like mechanism 49 which has an arm 47 connected to a crank 46 driven by associated movement within a gear box 45 through an universal joint 44. A plurality of needles are embedded in a row on the surface of the arm 47, of which is regulated to be ellipse motion by a guide roller 51 fixed at the back side of the arm head 50 within a guide slit 50a. At this time, another comb-like mechanism (49a) with plural number of needles 48a which are staggered relative needles 48 of mechanism 49 is actuated by a crank shaft 46a in a gear 45a installed on the front center of the chassis 1 similarly described as above. Moving back and fro with ellipse motion of such comb-like mechanisms 49, 49a, the device scrapes off lower leaves of the plants.

While parsley is carried by the belts 32a, 33a suspended therein, their lower withered leaves are scraped off by comb-like mechanisms 49b, 49c actuated by a crank shaft 46c in a gear box 45b and another crank shaft 46b in a gear box 45a.

The parsley moving on rubber belts 32, 33 are held by their lower stems between the rubber belts 42, 43 and such dual pairs of belt transfer the parsley in vertical status up to the upper slant frame of the chassis 1.

At that time, parsleys sandwiched by another pair of rubber belts 32a, 33a are held at their lower stems by rubber belts 42a, 43a which run in parallel under the former belts, and both upper and lower pairs of conveyer belts carry the parsley in their upright condition towards the upper portion of the chassis.

Figure 6:
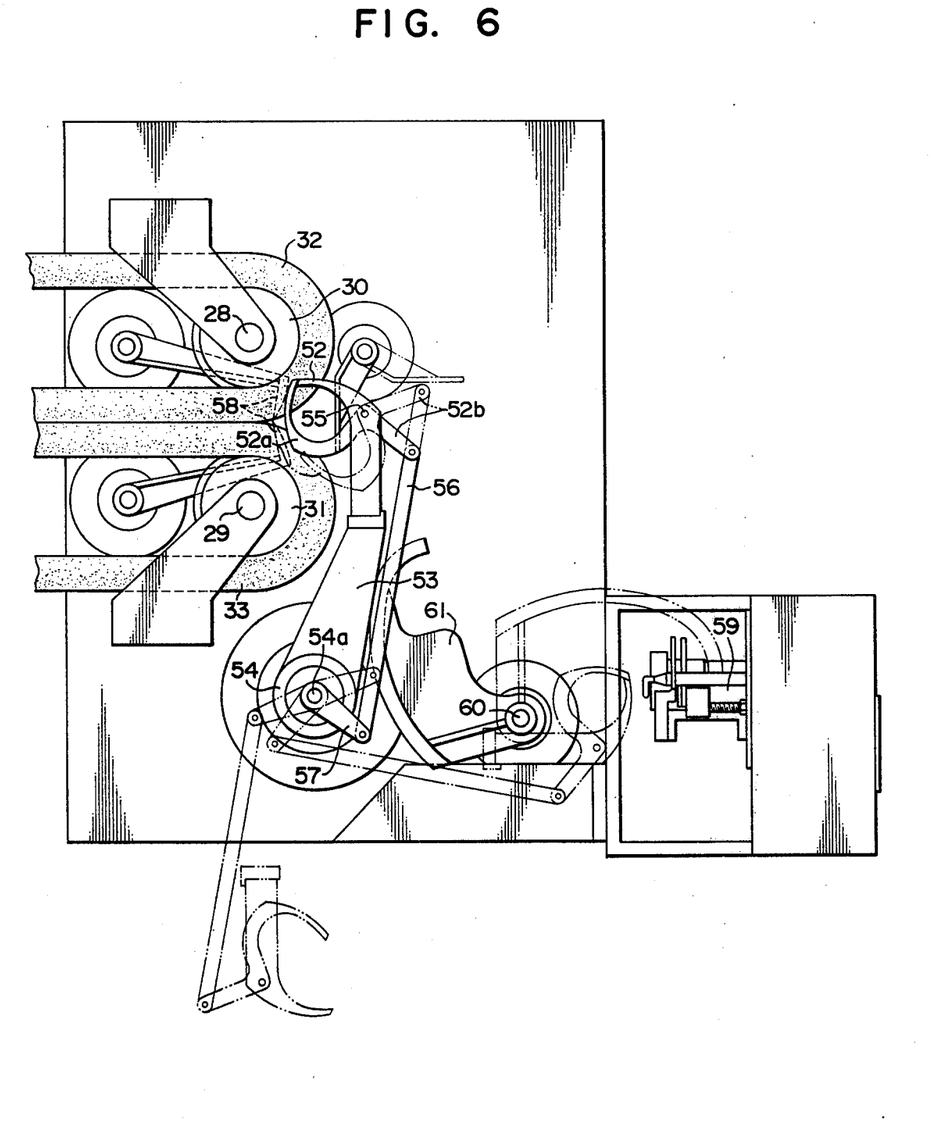
FIG. 6 is a plan view of supporting arms and bundling device at the ends of the rubber belts.

When the parsley plants supported among the rubber belts 32, 33 and the lower belts 42, 43 are about to reach the ends of the belts, they are received into the mouth of supporting arms 52, 52a which are open. The arm 52 has a rod 53 which slowly rotates around a rotary axis, while another arm 52a is pivotally mounted to the arm 52 by an arbor 55. A branch arm 52b which is integral with the supporting arm 52a is adjustably connected to a swinging arm 57 which ia also attached to a rotary axle 54a coaxially with a rotary axle 54 through an associated link rod 56, and rotary axle 54a is intermittently rotated by means of a cam mechanism or similar convenient mechanism (not shown in drawing). When the supporting arm 52 is rotated to the opposite position at the ends of the rubber belts 32, 33, another arm revolves from the mouths as shown by a dotted line to a closed position as shown by a solid line after a rotation around the arbor 55, thereby supporting the plants within the both arms 52, 52a and then, new parsleys which keep coming, held by the rubber conveyer belts 32, 35 are blocked from going further by stoppers 58, 58a which revolve the end of both rubber belts 32, 33.

Thereafter, both supporting arms 52, 52a rotate 90 degrees around the rotary shaft 54 in a closed condition and a binder 59 bundles up several plants with either a metallic or vinyl string.

The bundle being held by both supporting arms 52, 52a is furthermore revolved by another 90 degrees, at which position arm 52a rotates around the arbor 55 by an action of the cam mechanism, thereby causing the both supporting arms 52, 52a to open thereby to drop the bundle and the both supporting arms 52, 52a return to the original position in opposition to face the ends of rubber belts 32, 33 keeping the arms open again.

Operation of the binder 59 is started to bundle up the plants by switching on the clutch when an actuating arm 61 of rotary shaft 60 reciprocally rotates at a fixed time with the rotary shaft 54 and meets the binder 59 as shown by a dotted line.

Plants held on other rubber belts 32, 32a and the lower rubber belts 42a, 43a are supported by the supporting arm similarly and bundled by another binder 59a.

The reaping machine with binders of this invention as mentioned above cuts the plant stems close at the base, carries them on rubber belts while running the reaping machine along the rows of ridges in the field, sweeps away the lower dead leaves during said carriage, and bundles up the plants. As the dead leaves of the parsleys reduce the value and because the green leaves of the plants are eaten, such withered leaves are particularly scraped and swept away from either sides, by a pair of comb-like devices, which can be considered to be a feature.

In view of the description as above, such rubber belts can be a quite convenient when they have suitable elastic and tensile strength.

Now, the second embodiment will be discussed.

Figure 7:
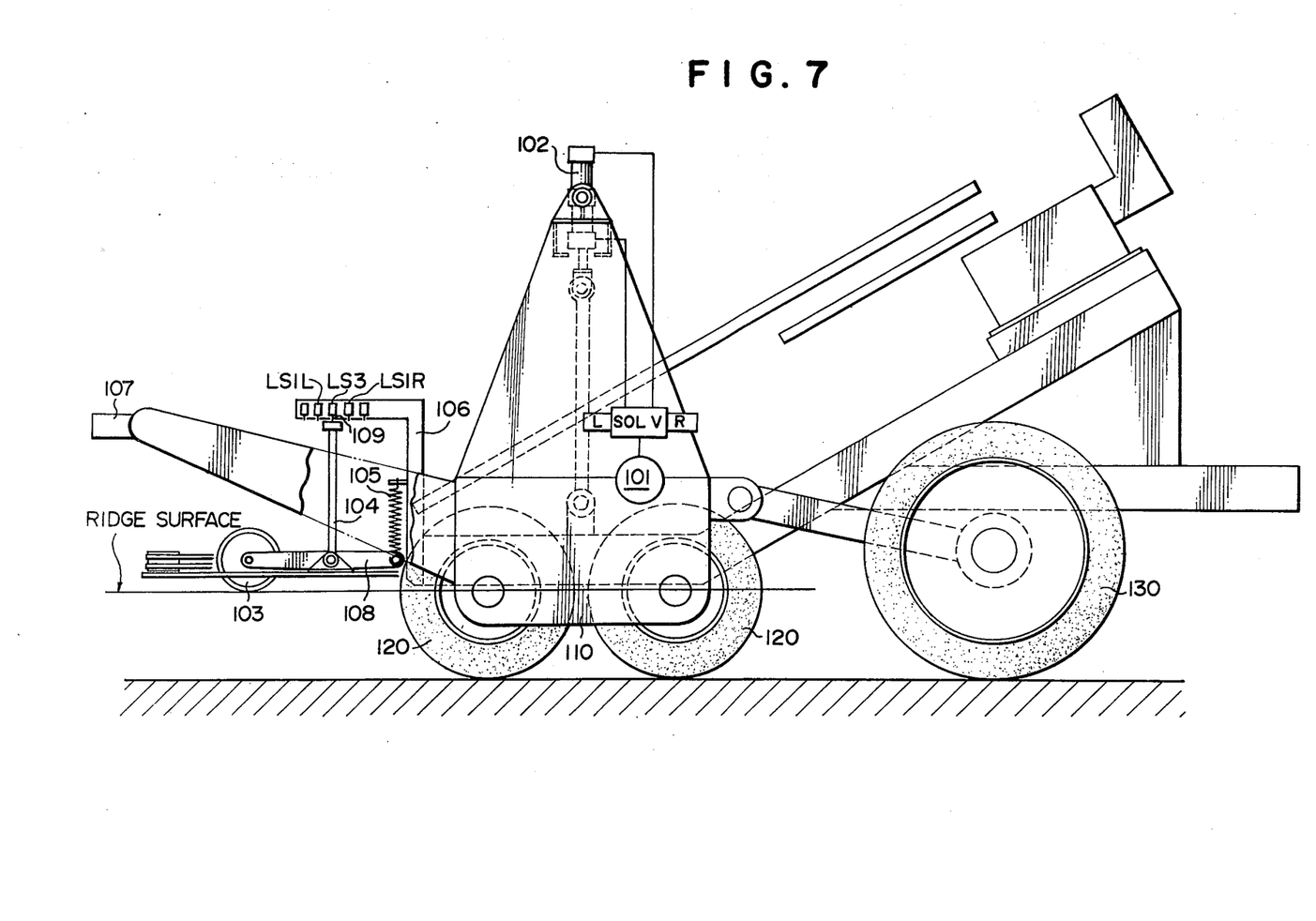
FIG. 7 is a left side view of the machine according to another embodiment.

The second embodiment in FIG. 7 further provides a roller (103) which senses a different height of the ridge of the field in contact with the ridges, and arm 108 which pivotably supports sensing roller 103, an upright arm 104 which is securely fixed with supporting arm 108 at a right angle and having a contact point 109, a spring 105 which is fixed at its one end with one end of supporting arm 108 and hooked at its another end with an L-shaped angle 106 secured with the chassis, limit switches LSIL, LS3, LSIR fixed on angle 106 in order that they contact with contact point 109 in proportion to the different height of the ridge, a tractor hydraulic device for raising and lowering the auxiliary wheels 120 supported by each supporting frame 110 which is raised or lowered by an oil pressure cylinder (102), so that the chassis and the cutter are raised or lowered in proportion to the height of the ridge. As a result, solenoid valves SOLVL and SOLVR actuate said cylinder 102, and an electric circuit connects the limit switches, the contact point 109 and solenoid valves, and an electric power source for the electric circuit (not shown).

According to the above construction, the cutter always cuts at the center of the plant, in proportion to the different height of the ridge.

Figure 8:
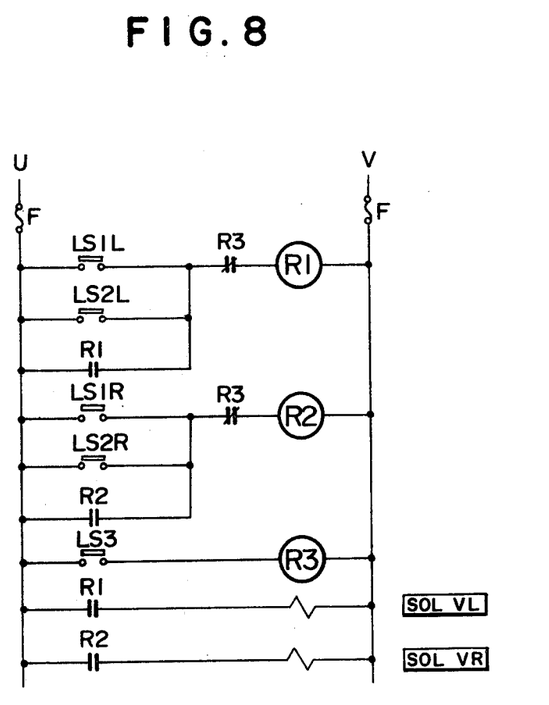
FIG. 8 is a diagram of the electric circuit for the second embodiment.

In operation, when the some part of the ridge is higher, the roller 103 is raised thereon and the supporting arm 108 declines at its right side, then it causes the upright arm 104 to right side, so that the contact point 109 moves to the right and comes in contact with the limit switch LSIR, which is in turn closed together with another limit switch LS2L in FIG. 8. Then, relay R2 is circle is energized and the R2 is self-supported, and it causes the solenoid valve SOLVR to be actuated. This causes the oil pressure cylinder 102 to be shortened thereby lowering the frame 110, and thus the auxiliary wheels 120. Thus the cutter fixed at the bottom of the chassis is positioned a little higher so as to cut at the center of the plants.

When some part of the ridge is lower, the upright arm declines to the left side, and thus limit switches LSIL, LS2L, relays R1 and the solenoid valve SOLVL are actuated. Thus, the oil pressure cylinder 102 is extended, thereby raising the frame 110 and the position of the chassis with the cutters secured thereunder is lowered as a result. Thus, the plants are still cut at their center.

Numeral 107 in FIG. 7 is a link connection for tractor and symbol F in FIG. 8 is a fuse.

As a variation, the sensing roller 103 may drag the ground like a ski and the functional operation is the same as the second embodiment.

I claim:

1. A reaping and bundling machine for parsley including:
   (a) a chassis and a plurality of rotary disk cutters mounted on said chassis for rotating horizontally around their axis at the lower front of said chassis and slightly above the parsley field surface so that the cutter blades cut the parsley plants at their lower stems;

(b) a first pair of circulating elastic and resilient endless belts mounted on said chassis to receive and carry the top of the cut parsley stems and means mounted on said chassis for driving said first pair of belts;

(c) a plurality of comb-like mechanisms mounted on said chassis adjacent said belts for scraping and cutting off yellowish lower leaves of the stems of the plants which are supported by and between said first pair of belts;

(d) a second pair of endless belts mounted on said chassis adjacent and below said first pair of belts, said second pair moving at the same speed as said first belts for receiving said parsley leaves after scraping and cutting and supporting the parsley stems adjacent the bottom so as to maintain them in upright condition;

(e) at least one supporting arm mounted on said chassis to support and receive several parsley plants at the rear ends of the said belts;

(f) at least one binder for bundling up the parsley plants while supported by said arm; and (g) at least one releasing mechanism for releasing said bundles of parsley after binding.

2. A machine according to claim 1, further including a pair of said comb-like mechanisms wherein each has at least one row of needles so that swinging to and fro movement of the comb-like mechanisms scrapes the lower leaves off the parsley stems.

3. A machine according to claim 1, wherein said belts are essentially made of rubber.

4. A machine according to claim 1, wherein said chassis has an upper slant surface, whose front end is low while the rear is higher.

5. A machine according to claim 1, wherein it further comprises a roller which detects the height of the ridge of the field and contacts said ridges, an arm which pivotably supports said sensing roller, an upright arm which is securely fixed with said supporting arm at a right angle, and having a contact point, an L-shaped angle member, a spring which is fixed at its one end with one end of said supporting arm and hooked at its other end with said L-shaped angle member secured to said chassis, a plurality of limit switches fixed on said angle to contact with said contact point in proportion to the different height of the ridge, auxiliary wheels mounted on said chassis, a tractor hydraulic device mounted on said chassis for raising and lowering said auxiliary wheels pivotably supported by each supporting frame including an oil pressure cylinder, solenoid valves which actuate said cylinder, and an electric circuit connecting said limit switches, said contact point and solenoid valves, and an electric power source for the electric circuit.

* * * * *